(12) United States Patent
Kleinerman

(10) Patent No.: US 10,895,973 B2
(45) Date of Patent: Jan. 19, 2021

(54) BROWSING HIERARCHICAL DATASETS

(71) Applicant: Google LLC, Mountain View, CA (US)

(72) Inventor: Michael Kleinerman, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/391,488

(22) Filed: Apr. 23, 2019

(65) Prior Publication Data

US 2020/0341606 A1     Oct. 29, 2020

(51) Int. Cl.
    *G06F 3/0485*     (2013.01)
    *G06F 3/0482*     (2013.01)
    *G06F 16/22*     (2019.01)
    *G06F 16/25*     (2019.01)

(52) U.S. Cl.
    CPC .......... *G06F 3/0485* (2013.01); *G06F 3/0482* (2013.01); *G06F 16/221* (2019.01); *G06F 16/252* (2019.01)

(58) Field of Classification Search
    CPC .... G06F 3/0482; G06F 3/0485; G06F 16/221; G06F 16/252
    See application file for complete search history.

(56) References Cited

U.S. PATENT DOCUMENTS

| | | | | |
|---|---|---|---|---|
| 5,767,854 A * | 6/1998 | Anwar | ................... | G06F 3/0481 715/848 |
| 7,580,938 B1 * | 8/2009 | Pai | .......................... | G06F 3/0482 |
| 7,610,300 B2 * | 10/2009 | Legault | ................... | G06Q 10/00 |
| 2007/0226155 A1 * | 9/2007 | Yu | .......................... | G06Q 30/02 705/400 |
| 2008/0306983 A1 * | 12/2008 | Singh | ....................... | G06F 40/18 |
| 2012/0166486 A1 * | 6/2012 | Visser | ..................... | G06F 40/18 707/792 |

(Continued)

FOREIGN PATENT DOCUMENTS

WO      WO-9944164 A1 *    9/1999      ............. G06F 40/18

OTHER PUBLICATIONS

"Creating and Managing Dimensions with Level-Based Hierarchies", posted on Jun. 23, 2016 to https://docs.oracle.com/middleware/12211/biee/BIEMG/GUID-3383503F-FBDA-4EB4-99B6-C2E7C3B5F24B.htm#create_manage_dim, retrieved Sep. 9, 2020 (Year: 2016).*

*Primary Examiner* — Shourjo Dasgupta
(74) *Attorney, Agent, or Firm* — Honigman LLP; Brett A. Krueger

(57) ABSTRACT

A method includes a hierarchical dataset that includes a root-data object and data collections nested under the root-data object. Each data collection includes one or more data objects, each data object associated with one or more other data collections. The method also includes displaying a hierarchical user interface on a screen. The hierarchical user interface includes column. The columns include data-object columns and data-collection columns, wherein the columns alternate between data-object columns and data-collection columns. Each data-object column displays a list of the one or more data objects of a respective data collection. Each data-collection column displays a list of the one or more data collections of a respective data object, the data-collection columns includes a root-data-collection column displaying a list of the one or more data collections associated with the root-data object.

22 Claims, 10 Drawing Sheets

(56) References Cited

U.S. PATENT DOCUMENTS

| | | | |
|---|---|---|---|
| 2014/0046985 A1* | 2/2014 | Gauthier | G06F 40/177 707/812 |
| 2015/0178407 A1* | 6/2015 | Hughes | G06F 16/9032 707/768 |
| 2016/0335303 A1* | 11/2016 | Madhalam | G06F 16/252 |
| 2016/0364772 A1* | 12/2016 | Denton | G06Q 30/0276 |
| 2017/0270697 A1* | 9/2017 | Keys | G06T 11/206 |
| 2018/0032518 A1* | 2/2018 | Kordasiewicz | G06Q 50/18 |
| 2019/0050445 A1* | 2/2019 | Griffith | G06F 16/22 |

* cited by examiner

Tabular UI 500

| Document ID | Subcollections | albumTitle | artistId | genre | playCount | releaseDate |
|---|---|---|---|---|---|---|
| 192u84yBy389248 | songs | in Rainbows | Radiohead | Electronica | 123894 | Jun, 2007 |
| 545fsqpkg9sdjgp | songs | Hot Fuss | The Killers | Electronica | 98762345 | Mar, 2016 |
| gijie09tj0w486425a2 | songs | Fear of Us | Lamb | Electronica | 54367 | Oct, 2014 |
| 1251864615616 | songs | Halo | Junana Molina | Electronica | 24 | Jun, 2017 |
| 632fsgalliradjgp | songs | Jungle | Jungle | Electronica | 57 | Mar, 2016 |
| trip08ikjlr4864st2 | songs | Woman | Justice | Electronica | 879569 | Oct, 2014 |
| 98221864615616 | songs | Bedrock 18 Signals | John Digweed | Electronica | 4567 | Jun, 2017 |
| 8942sdpHGEr7p | songs | Fear of Falling | Joey Fehrenbach | Electronica | 978 | Mar, 2016 |
| jleorinvae902394s | songs | New Life | Jeremy Glenn | Electronica | 4768 | Oct, 2016 |
| 769543jkerioiw20o9 | songs | Jamie lidell | Jamie Lidell | Electronica | 154267 | Jun, 2017 |
| 234ert084ua092 | songs | Kicking the National Habit | Grand National | Electronica | 90 | Mar, 2016 |
| 23790yms79s9s | songs | Humanz | Gorillaz | Electronica | 245 | Oct, 2014 |
| nrarle92slekr9 | songs | Maggot Brain | Funkadelic | Electronica | 9876 | Jun, 2017 |
| 52a09r89BKplr | songs | Iteration | Com Truise | Electronica | 23465 | Mar, 2016 |
| MN09442Kyare2 | songs | Love Exposure | Croquet Club | Electronica | 4678 | Oct, 2014 |
| HN87hgh7492g | songs | Val Maira | Dave DK | Electronica | 2456 | June, 2017 |

FIG. 5

BROWSING HIERARCHICAL DATASETS

TECHNICAL FIELD

This disclosure relates to browsing hierarchical datasets.

BACKGROUND

Many areas of computing involve hierarchically organized data sets, as well as techniques for display and navigation through such data sets. A hierarchically organized set of such data items, also known as nodes, may be organized with one or more items at the topmost level, known as root nodes. Each node may contain any number of subordinate items, known as child nodes, which may in turn contain any number of subordinate items, etc. This organizational structure provides for a hierarchy of containment, where each node, except for the root node, is contained within one higher-level node, also referred to as a parent node.

SUMMARY

A first aspect of the disclosure provides a method that includes receiving, at data processing hardware, a hierarchical dataset. The hierarchical dataset includes a root-data object and data collections nested under the root-data object. Each data collection includes one or more data objects. Each data object is associated with one or more other data collections. The method further includes displaying, by the data processing hardware, a hierarchical user interface on a screen. The hierarchical user interface includes columns. The columns include data-object columns and data-collection columns. Each data-object column displays a list of the one or more data objects of a respective data collection. Each data-collection column displays a list of the one or more data collections of a respective data object. The data-collection columns include a root-data-collection column displaying a list of the one or more data collections associated with the root-data object. The columns alternate between data-object columns and data-collection columns. The method further includes receiving, at the data processing hardware, a user-selection indicating one of a selected data collection or a selected data object. In response to the user-selection indicating selection of the selected data collection, the method includes: identifying, by the data processing hardware, the respective data-collection column of the selected data collection; and displaying, by the data processing hardware, in the adjacent data-object column the one or more other data objects associated with the selected data collection. In response to the user-selection indicating selection of the selected data object, the method includes: identifying, by the data processing hardware, the respective data-object column of the selected data object; and displaying, by the data processing hardware, in the adjacent data-collection column the one or more other data collections associated with the selected data object.

Implementations of the disclosure may include one or more of the following optional features. The user interface may include a lateral scroll bar configured to scroll laterally among the columns. In some examples, at least one data-collection column includes an add-collection form. The add-collection form is configured to: receive data collection parameters for a new data collection, the data collection parameters including a parent reference to a parent data object; and associate the new data collection with the respective parent data object.

In some implementations, after associating the new data collection with the respective parent data object, the method includes: receiving, at the data processing hardware, a user-selection indicating selection of the new data collection; and in response to receiving the user-selection indicating selection of the new data collection, displaying, by the data processing hardware, in the adjacent data-object column an add-object form. The add-object form is configured to: receive data object parameters for one or more new data objects, the data object parameters including a parent reference to the new data collection; and associate the one or more new data objects with the respective new data collection.

The method may include displaying, by the data processing hardware, a filter form on the screen, receiving, at the data processing hardware, a filter condition inputted into the filter form, and filtering, by the data processing hardware, the display of the hierarchical user interface in accordance the filter condition. After filtering the display of the hierarchical user interface, the method may include displaying a visual indicator in the hierarchical user interface indicating the filter condition.

At least one data-object column may include a filter form. The filter form is configured to receive one or more filter conditions for the list of the one or more data objects displayed by the respective data-object column and filter the display of the list of the one or more data objects in accordance with the one or more filter conditions.

In some implementations, the method includes receiving, at the data processing hardware, a user-selection indicating selection of a tabular view. In response to receiving the user-selection indicating selection of the tabular view, the method further includes transitioning, by the data processing hardware, from displaying the hierarchical user interface on the screen to display of a tabular user interface on the screen. The tabular user interface includes root-data-collection rows. Each root-data-collection row displays a respective data collection of the list of the one or more data collections associated with the root-data object. Each root-data-collection row may include one or more categorical columns. Each categorical column is associated with a respective category and each root-data-collection row includes a respective value assigned to each categorical column.

While displaying the tabular user interface, the method may include: displaying, by the data processing hardware, a filter form on the screen; receiving, at the data processing hardware, one or more filter conditions inputted into the filter form; and filtering, by the data processing hardware, the display of the tabular user interface in accordance the one or more filter conditions. After filtering the display of the tabular user interface in accordance with the one or more filter conditions, the method may include receiving, at the data processing hardware, a user-selection indicating selection of a hierarchical view. In response to receiving the user-selection indicating selection of the hierarchical view, the method includes transitioning, by the data processing hardware, back to displaying the hierarchical user interface on the screen. The display of the hierarchical user interface is filtered in accordance with the one or more filter conditions that were inputted into the filter form while displaying the tabular user interface.

A second aspect of the disclosure provides a system that includes data processing hardware and memory hardware in communication with the data processing hardware and storing instructions that when executed by the data processing hardware cause the data processing hardware to perform operations of the method of the first aspect of the disclosure.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 5 is a schematic view of a tabular user interface for viewing the hierarchical dataset of FIG. 1.

Like reference symbols in the various drawings indicate like elements.

DETAILED DESCRIPTION

Effective organization and structure can be helpful in maintaining and sorting large amounts of electronic data. Hierarchical data structures are useful for organizing electronic data by providing a clear and effective way to input and retrieve discrete files. Generally, hierarchical data structures arrange data within hierarchical levels where each hierarchical level includes multiple nodes representing a data category and each node within a given hierarchical level includes multiple leaf/child nodes in the next hierarchical level and so on. Thus, when presenting these hierarchical structures, a user selection of one of the nodes in a first hierarchical level results in the display of multiple leaf nodes in a second hierarchical level associated with the selected node from the first hierarchical level. However, users are generally limited in the ability to view and compare data from multiple leaf nodes in different hierarchical levels at the same time.

Implementations herein are directed toward displaying hierarchical datasets using a hierarchical user interface having multiple columns that include data-object columns and data-collection columns. Each data-object column displays a list of one or more data objects of a respective data collection, while each data-collection column displays a list of one or more data collections of a respective data object. In these implementations, the data-collection columns include a root-data-collection column displaying a list of the one or more data collections associated with the root-data object. To enable a user to easily navigate the hierarchical dataset and compare data from multiple leaf nodes in different hierarchical levels simultaneously, the hierarchical user interface alternates the columns between data-object columns and data-collection columns. Thus, the user is always presented with the ability to provide user-selections indicating one of a selected data collection or a selected data object in one of the columns, without having to back-track through the selection of multiple child nodes to make data comparisons in different hierarchical levels.

Figure 1:
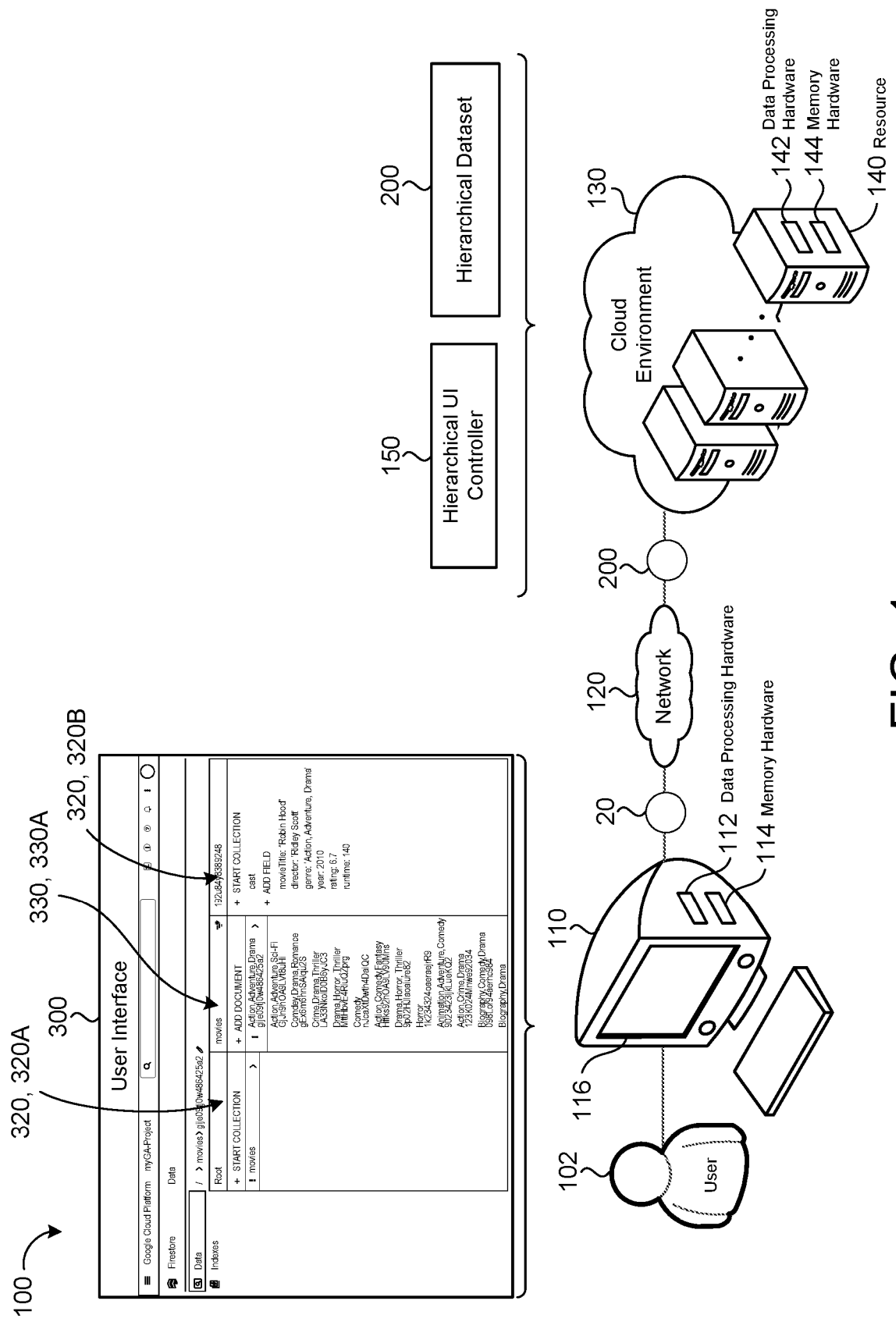
FIG. 1 is a schematic view of an example system for displaying a hierarchical user interface for viewing a hierarchical dataset.

Referring to FIG. 1, in some implementations, an example system 100 generates and displays a hierarchical user interface (UI) 300 for viewing a hierarchical dataset 200. The system 100 includes a user device 110 associated with a user 102 and in communication with a remote system 130 via a network 120. The user device 110 corresponds to a computing device, such as, without limitation, a desktop workstation, a laptop workstation, or a mobile computing device (e.g., smart phone or tablet). The remote system 130 may be a distributed system (e.g. a cloud environment) having scalable/elastic resources 140 including computing resources 142 (e.g., data processing hardware) and storage resources 144 (e.g., memory hardware). The computing resources 142 may include a service abstraction layer and a hypertext transfer protocol wrapper over a server virtual machine instantiated thereon. As such, the computing resources 142 may be configured to receive and parse HTTP(S) requests (e.g., dataset request 20) from the user device 110 and send HTTP(S) responses (e.g., the hierarchical data set 200) to the user device 110.

In the example shown, the computing resources 142 manage storage of the hierarchical dataset 200 on the storage resources 144. The computing resources 142 may further execute a hierarchical UI controller 150 that is configured to communicate with the user device 110 and act as an interfacing mechanism for enabling the user device 110 to receive the hierarchical dataset 200 and perform operations (e.g., read/write) on the hierarchical data set 200. Specifically, the hierarchical UI controller 150 may enable data retrieval of the hierarchical dataset 200 from the storage resources 144 and updates to the hierarchical dataset 200 in response to interactions by the user 102 via the hierarchical UI 300 displayed on a screen 116 of the user device 110. For instance, the data processing hardware 112 of the user device 110 may send a dataset request 20 to the hierarchical UI controller 150 requesting retrieval of the hierarchical dataset 200.

Figure 2:
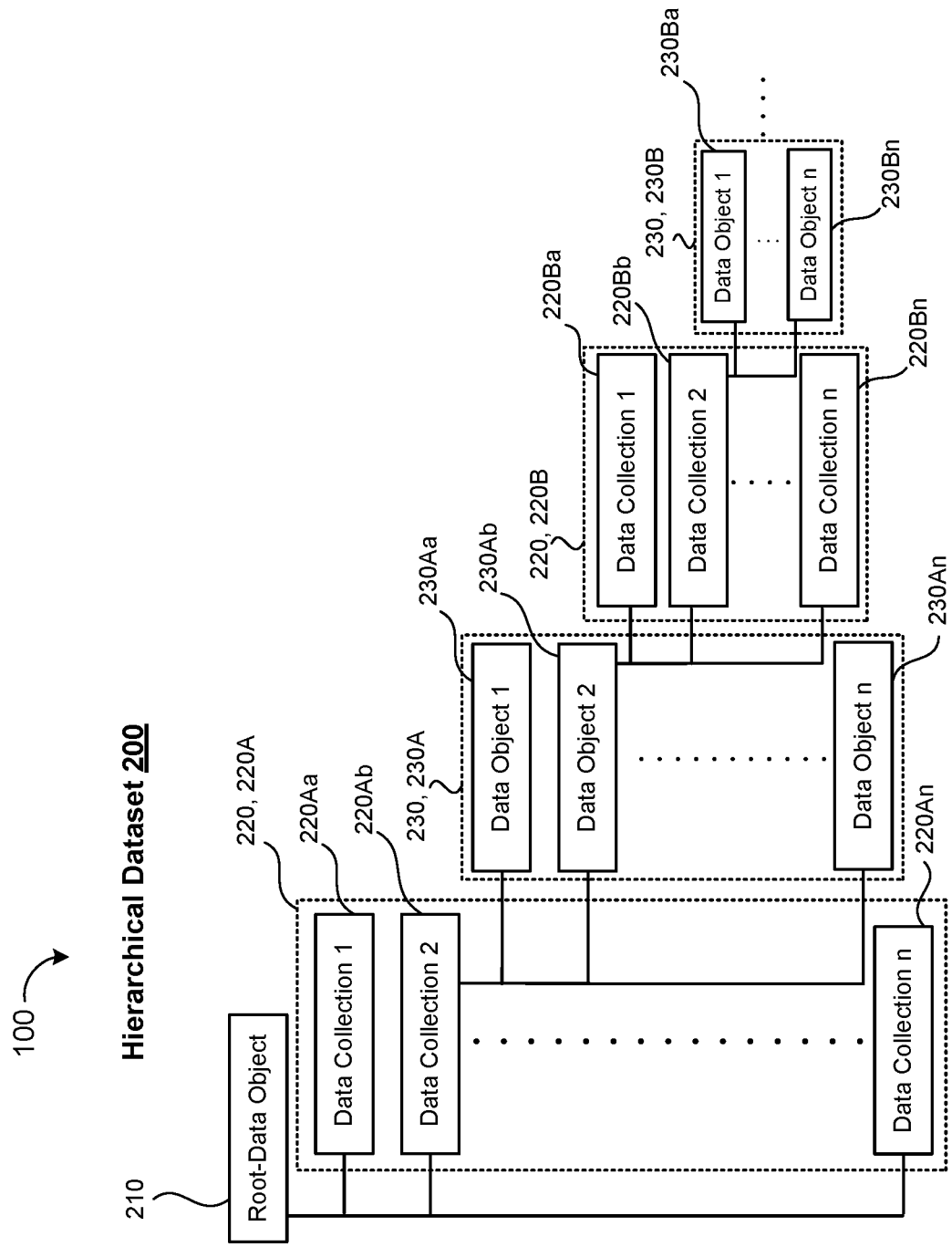
FIG. 2 is a schematic view of an example hierarchical dataset.

In some implementations, the user device 110 (i.e., via the data processing hardware 112) receives the hierarchical dataset 200 and displays the hierarchical UI 300 on the screen 116 of the user device 110. While FIG. 1 shows the user device 110 receiving the hierarchical dataset 200 from the remote system 130, the entire functionality of the system 100 for receiving the hierarchical dataset 200 and displaying the hierarchical UI 300 may be implemented entirely on the user device 110 (e.g., client-side) without departing from the scope of the present disclosure. Referring to FIG. 2, an example hierarchical dataset 200 includes a root-data object 210 and one or more data collections 220, 220Aa-n nested under the root-data object 210. Each data collection 220 includes one or more data objects 230, 230A, 230B, and each data object 230 may be associated with one or more other data collections 220, 220B. For instance, a plurality of data collections 220Aa-n nested under the root-data object 210 may correspond to a first set of data collections 220A. Here, the root-data object 210 may be associated with music albums and each data collection 220 in the first set of data collections 220A may correspond to a respective music album that the user 102 owns or can access. Nested under a second data collection 220Ab (e.g., Data Collection 2) in the first set of data collections 220A, is a plurality of data objects 230Aa-n associated with a first set of data objects 230A. Continuing with the example, each data object 230 in the first set of data objects 230A may correspond to a respective song from the music album corresponding to data collection 220Ab.

The hierarchical dataset 200 then alternates from data objects 230 back to data collections 220. Here, a plurality of data collections 220Ba-n nested under a second data object 230Ab (e.g., Data Object 2) in the first set of data objects 230A may correspond to a second set of data collections 220B associated with the second data object 230Ab, which may be, for example, information pertaining to the selected song, such as artist, producer, album, etc. Similarly, each data collection 220Ba-n in the second set of data collections 220B may be associated with one or more other data objects 230. In the example shown, a plurality of data objects 230Ba-n corresponding to a second set of data objects 230B are nested under a second data collection 220Bb (e.g., Data Collection 2) in the second set of data collections 220B. Continuing with the example, if the second data collection 220Bb is associated with an artist of the selected song, then each data object 230 in the second set of data objects 230B may include a respective song recorded by that artist. This hierarchical structure of the dataset 200 may continue, alternating between data collections 220 and data objects 230.

In some examples, the screen 116 of the user device 110 includes a touch screen 116 displaying the hierarchical UI 300. The data processing hardware 112 may execute graphical user interface (GUI) software adapted to facilitate browsing and interaction with the hierarchical dataset 200 provided by the remote system 130 by facilitating rendering of the hierarchical dataset 200 for display as the hierarchical UI 300 on the screen 116. Here, the hierarchical UI 300 includes any data characterized by objects (i.e., root-data object 210, data collections 220, and data objects 230) or other elements of the hierarchical dataset 200, as well as provides functionality to exhibit one or more hierarchical relationships relative to other objects. As such, the hierarchical UI controller 150 executing on the remote system 130 may provide webpage code implemented via one or more Application Programming Interfaces (APIs), web services, and/or other mechanisms to enable user interaction with the hierarchical UI 300. For instance, the user 102 may provide user-selections indicating selections to navigate a hierarchy of underlying data used to generate the hierarchical UI 300 that alternates between data-object columns 230 and data-collection columns 220. Described in greater detail below with reference to FIG. 5, the user 102 may provide user-selections to transition from displaying the hierarchical UI 300 on the screen 116 to displaying a tabular UI 500 on the screen 116 for viewing the hierarchical dataset 200.

As used herein, a user-selection may be directed to a UI control that includes any displayed element or component of the hierarchical UI 300 displayed on the screen 116. As such, user-selection indicating selection of a UI control may permit the user 102 to provide input, view data, and/or otherwise interact with the hierarchical UI 300. Example UI controls include buttons, drop down menus, menu items, tap-and-hold functionality, etc.

Representations of the data collections 220 and the data objects 230, i.e., displayed data collections 220 and displayed data objects 230, may be displayed via graphical indicators, such as a file name/number, a node of visualization, a menu item, a dialog box, personnel icon, etc. In some configurations, the data collections 220 and the data objects 230 are displayed via unique document identifications (IDs) associated with each of the data collections 220 and the data objects 230. Each document ID may be a unique alphanumeric key. Alternatively, the data collections 220 and the data objects 230 may be identified and displayed in any suitable manner.

Figure 3A:
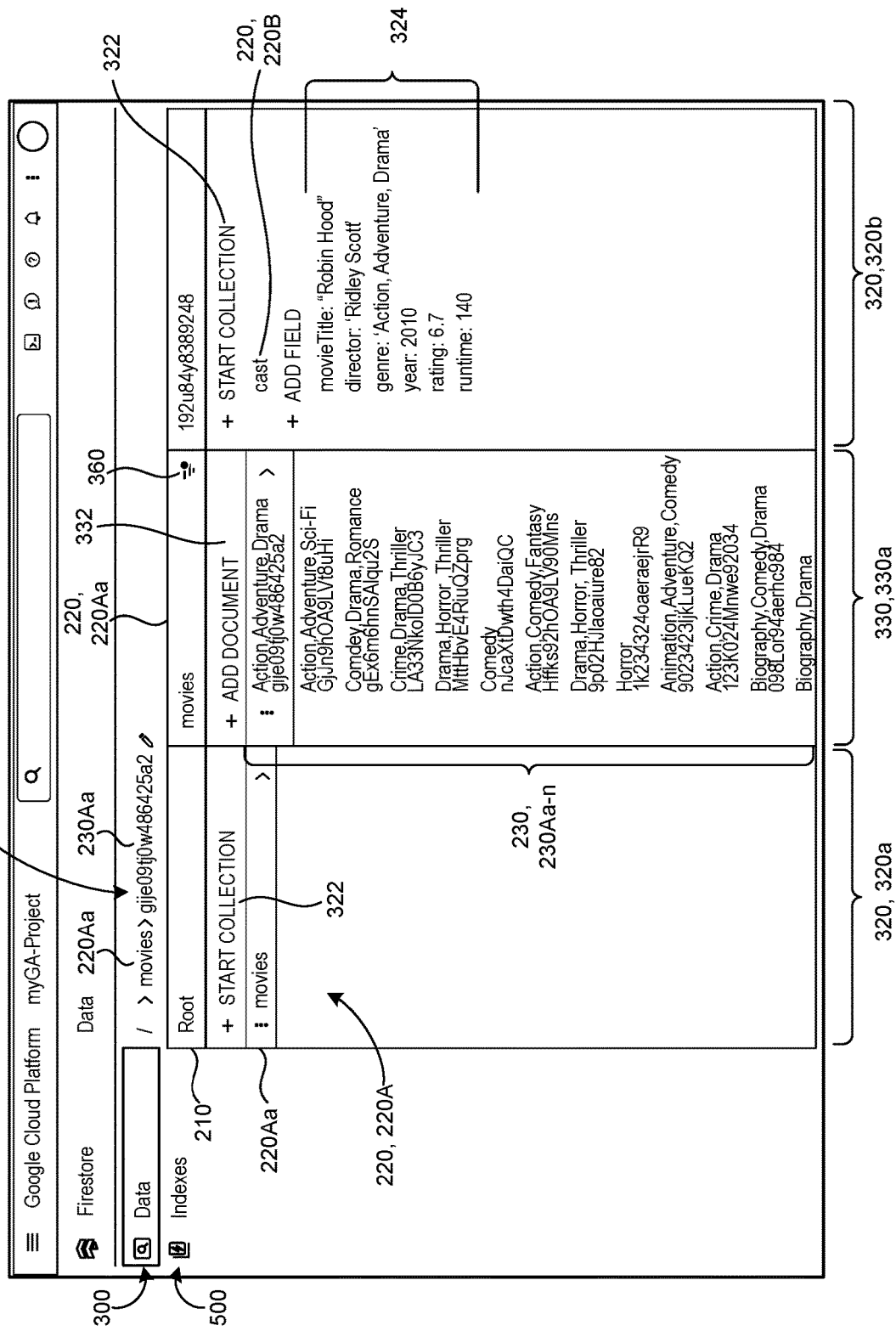
FIG. 3A is a schematic view of the hierarchical user interface of FIG. 1.
Figure 3B:
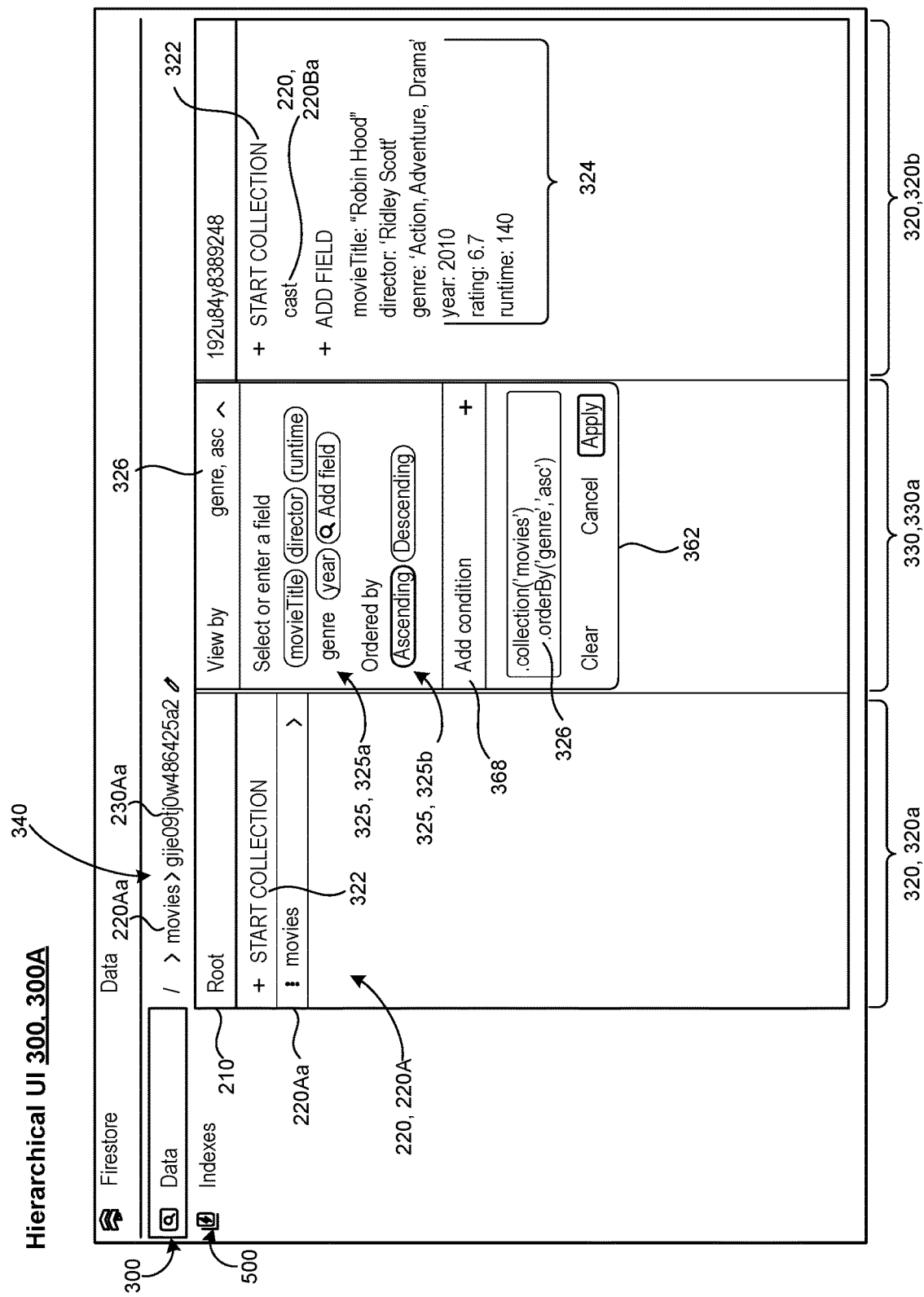
FIG. 3B is a schematic view of the hierarchical user interface of FIG. 1 including a filter form for inputting one or more filter conditions.

Referring to FIGS. 3A and 3B, an example hierarchical UI 300, 300A includes data-collection columns 320 and data-object columns 330 laterally adjacent to the data-collection columns 320. The data-collection columns 320 include a root-data-collection column 320a displaying a list of the one or more data collections 220, 220A associated with the root data object 210. Upon a user selection indicating selection of one of the data collections 220Aa (e.g., movies), a first data-object column 330, 330a laterally adjacent to the root-data-collection column 320a, may display a plurality of data objects 230, 230Aa-n nested under the selected data collection 220 (e.g., the first data collection 220Aa) displayed in the root-data-collection column 320a. Upon a selection indication indicating selection of one of the data objects 230A (e.g., "Action, Adventure, Drama gige09tj0w486425a2") displayed in the first data-collection column 330a, a second data-collection column 320, 320b, laterally adjacent to the first data-object column 330a, may display one or more other data collections 220B nested under the selected data object 230. In the example shown, the second data-collection column 320b displays a list of one or more attributes 324, 324B (also referred to as fields) associated with the selected first data object 230Aa in the first data-object column 330A. Upon a user selection indicating selection of one of the second data collections 220B (e.g., "cast"), a second data-object column 330 (not shown), laterally adjacent to the second data-collection column 320b, would populate to display a plurality of data objects 230 nested under the selected data collection 220 associated with the field "cast". To display this second data-object column 330 laterally adjacent to the second data-collection column 320b, the root-data-collection column 320a could be omitted and the first data-object column 330a and the second data-collection column 320b could be shifted laterally/horizontally to the left relative to the views of FIGS. 3A and 3B. In this scenarios, the hierarchical UI 300 may include a lateral scroll bar configured to scroll laterally among the column 320, 330. This hierarchical structure of the UI 300 may continue displaying, in an alternating repeating fashion, between data-collection columns 320 displaying data collections 220 and data-object columns 330 displaying data objects 230.

The data-collection columns 320 and the data-object columns 330 may be arranged such that, upon the hierarchical UI 300 receiving a user-selection indicating one of a selected data collection 220 or a selected data object 230, a subsequent laterally adjacent column may open/populate and display to the right of a prior laterally adjacent column. For instance, the hierarchical UI 300 may open/populate a new data-object column 330 for display when the user-selection indicates the selected data collection 220 listed in a corresponding adjacent data-collection column 320 (e.g., to the left), or the hierarchical UI 300 may open/populate a new data-collection column 320 for display when the user-selection indicates the selected data object 230 listed in a corresponding adjacent data-object column 330 (e.g., to the left). In this manner, the data-collection columns 320 and the data-object columns 330 may alternate repeatedly along the lateral/horizontal direction of the hierarchal UI 300 so that the user 102 can view/compare data from multiple columns, and thus multiple different hierarchies in the hierarchical dataset 200, simultaneously.

As set forth above, upon user-selection indicating selection of one of the data collections 220 or one of the data objects 230, the associated one of the data-object column 330 or the data-collection column 320 opens to the right and all of the previously displayed columns 320, 330 may shift laterally to the left. As shown in FIGS. 3A-4C, there may be three columns displayed on the screen 116 at any given time. However, the number of columns displayed on the screen 116 at any given time is non-limiting, and may include more or less than three columns. In some implementations, the number of columns displayed on the screen 116 is configurable by the user by explicitly stating the number of columns the user 102 would like to view. Additionally or alternatively, the hierarchical UI 300 may dynamically adjust the number of columns displayed on the screen 116 responsive to a zoom/magnification set by the user 102.

Moreover, after opening a new data-collection column 320 or a new data-object column 330 for display to the far-right of the screen 116, the user 102 may view previously presented data-collections 220 or data-objects 230 higher in the hierarchy by providing a user-selection indicating selection anywhere in the corresponding one of the data-collection column 320 or the data-object column 330 presenting the previously presented data-collections 220 or data-objects 230 that the user would like to re-visit and possibly make a different selection. In this scenarios, the recently new data-collection column 320 or the new data-collection object column 330 displayed to the far-right of the screen 116, may close or collapse while the other columns 320, 330 higher in the hierarchy may now shift back again to the right.

The hierarchical UI 300 may include a file-path indicator 340 indicating and displaying the present file path, e.g., the hierarchical structure of data presently being displayed. For example, the file-path indicator 340 displays the root data object 210, then displays the selected data collection 220, then displays, as applicable, the selected data object 230, and so on, as the path alternates between data collections 220 and data objects 230. Thus, the file-path indicator 340 may include an identifier, such as a document identifier (ID) or file name, associated with one of a recently selected data collection 220 listed in a respective data-collection column 320 or a recently selected data object 230 listed in a respective data-object column 330. For instance, FIG. 3A shows the file-path indicator 340 including an identifier "gije09tj0w486425a2" associated with the first data object 230Aa selected from the first data-object column 330a displaying a list of data collections 220Aa-n associated with movie titles nested under the root-data object associated with "movies".

In some implementations, the hierarchical UI 300 includes a lateral scroll bar 370 (FIGS. 4B and 4C) configured to scroll laterally among the columns. The lateral scroll bar 370 may be displayed at any suitable location, such as, the bottom of the screen 116, the top of the screen 116, etc. The lateral scroll bar 370 may allow the user 102 to scroll between previously opened columns 320, 330 in the hierarchy, as indicated by the file-path indicator 340, without having to close these previously-opened columns. However, the hierarchal UI 300 may permit the user 102 to provide user-selections indicating selections of previously opened columns (e.g., to the left), thereby causing the columns 320, 330 in the hierarchy to shift to the right and now display the previously data-collections 220 and/or data-objects 330 higher in the hierarchy back into view.

In the examples of FIGS. 3A and 3B, the second data-collection column 320b lists multiple attributes 324 that pertain to the selected data object 230Aa from the adjacent first data-object column 330a. For example, the attributes 324 of the selected data object 230Aa representing a movie may indicate a title of the movie, director, genre, year, rating, and runtime of the movie. The listed attributes 324 is non-limiting and there may be any suitable type of attributes listed depending on the respective data object 230 the attributes 324 are associated with. Further, the root data object 210 dictates the type of attributes 324 to be displayed. For example, if the root data object 210 is related to movies, then the attributes 324 may include movie title, director, etc. As another example, if the root data object 210 is related to music, then the attributes 324 may include artist, album, songs, genre, etc.

With continued reference FIGS. 3A and 3B, at least one of the data-collection columns 320 and the data-object columns 330 may include a respective filter button 360. For example, the data-object column 330a includes a respective filter button 360. Upon user-selection indicating selection of the filter button 360 of the data-object column 330a in FIG. 3A, FIG. 3B shows the hierarchical UI 300 displaying a filter form 362. Here, the filter form 362 is superimposed over the list of data-objects 230Aa-n within the first data-object column 330a to enable the user 102 to input one or more filter conditions 325 for filtering the display of the hierarchical UI 300 in accordance with the one or more filter conditions 325. In the example shown in FIG. 3B, the filter form 362 of the first data-object column 330a is configured to receive field type filter conditions 325a and data order filter conditions 325b. Here, the field type filter conditions 325a permit the user to select a designated field type for the list of data objects 230Aa-n (FIG. 3A) displayed in the first data-object column 330a. Specifically, among possible field types of genre, director, runtime, movieTitle, year, or another field type added, the hierarchical UI 300 receives a user-selection indicating selection of the field type associated with movie "genre". Further, the hierarchical UI 300 receives another user-selection indicating selection of the data order filter conditions 324b associate with ascending order (e.g., via selection of a corresponding "ascending" button" so that the data-objects 230Aa-n are listed in ascending order based on genre within the first data-object column 330a, as shown in FIG. 3A. In other scenarios, the data-objects 230Aa-n can be listed in descending order when a corresponding "descending" button is selected. The filter form 362 may also include an "add condition" button 368 to allow the user 102 to add additional filter conditions or deactivate previously selected filter conditions. The ordering can be alphabetical, numerical, or any other ordering type. To apply, clear, or cancel the one or more filter conditions 325, the filter form 362 of FIG. 3B provides respective clear, cancel, and apply buttons configured to receive user-selections. A visual indicator 326 may be presented in the filter form 362 (FIG. 3B) and/or the corresponding data-object column 330a (FIG. 3A) to indicate the applied filter condition, e.g., movie genre in ascending order. In some examples, the filter form 362 further allows the user to specify the list of multiple attributes 324 (e.g., movieTitle, director, runtime, genre, year, etc.) that will display in the adjacent second data-collection column 320b as pertaining to the selected data object 230Aa from the adjacent first data-object column 330a.

In some implementations, at least one data-collection column 320 includes an add-collection form 322 (e.g., "START COLLECTION") configured to receive data collection parameters for a new data collection 220. The data collection parameters received by the add-collection form 322 include a parent reference to a parent data object 230. Here, the add-collection form 322 is further configured to associate the new data collection 220 with the respective parent data object 230. For instance, FIGS. 3A and 3B show the root-data-collection column 320a include a respective add-collection form 322 configured to receive data collection parameters for a new data collection 220 in addition to the "movies" data collection. Similarly, the second data-collection column 320b includes an add-collection form 322 configured to receive data collection parameters for a new data collection 220 in addition to the "cast" data collection. Here, the received data collection parameters include the parent reference to the parent data object 320 associated with "movies" displayed in the laterally adjacent data-object column 330a.

In some examples, at least one data-object column 330 includes an add-object form 332 configured to receive data object parameters for one or more new data objects that include a parent reference to a parent data collection 320, and associate the one or more new data objects 330 with the respective parent data collection 330. For instance, FIG. 3A shows the data-object column 330a including an add-object form 332 (e.g., "Add Document") that permits the receiving of data object parameters for one or more new data objects 230 that include reference to, and are associated with, the respective parent data collection 220A for "movies". Suppose for example, the root-data-object column 320a received user-selection indicating selection of the add-collection form 322 (e.g., START COLLECTION) in which data collection parameters for a new data collection 220 associated with "television" are received. In this example, in response to receiving a user-selection indicating selection of the new data collection 220, the adjacent data-object column 330a would display an add-object form 332 ("Add Document") configured to receive data object parameters for one or more new data objects 230 associated with the respective new data collection 220 for "television". Thus, the one or more new data objects 230 could include a listing of television shows.

Figure 4A:
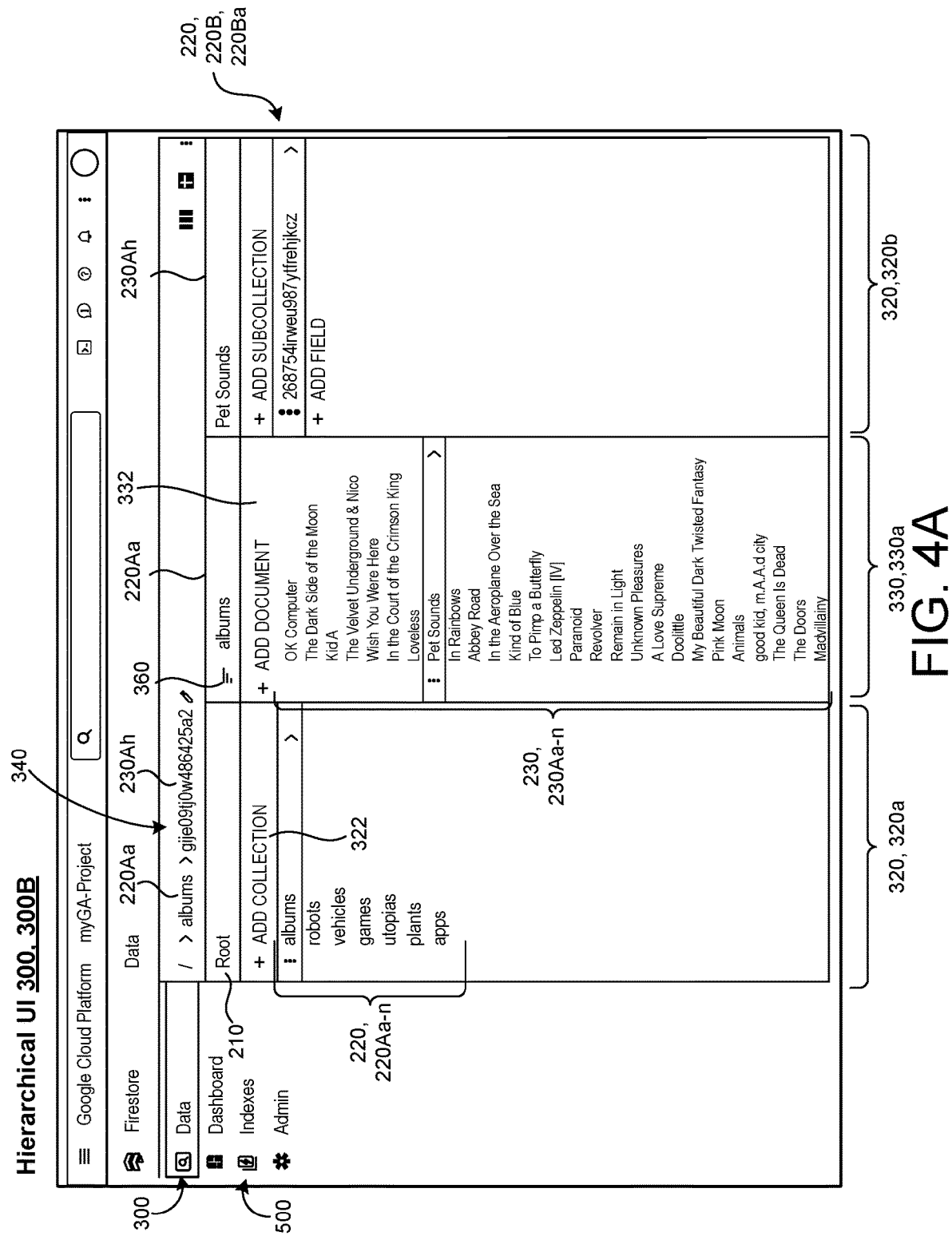
FIG. 4A is a schematic view of another hierarchical user interface, displaying a root-data object, a first data collection, and a first data object.
Figure 4B:
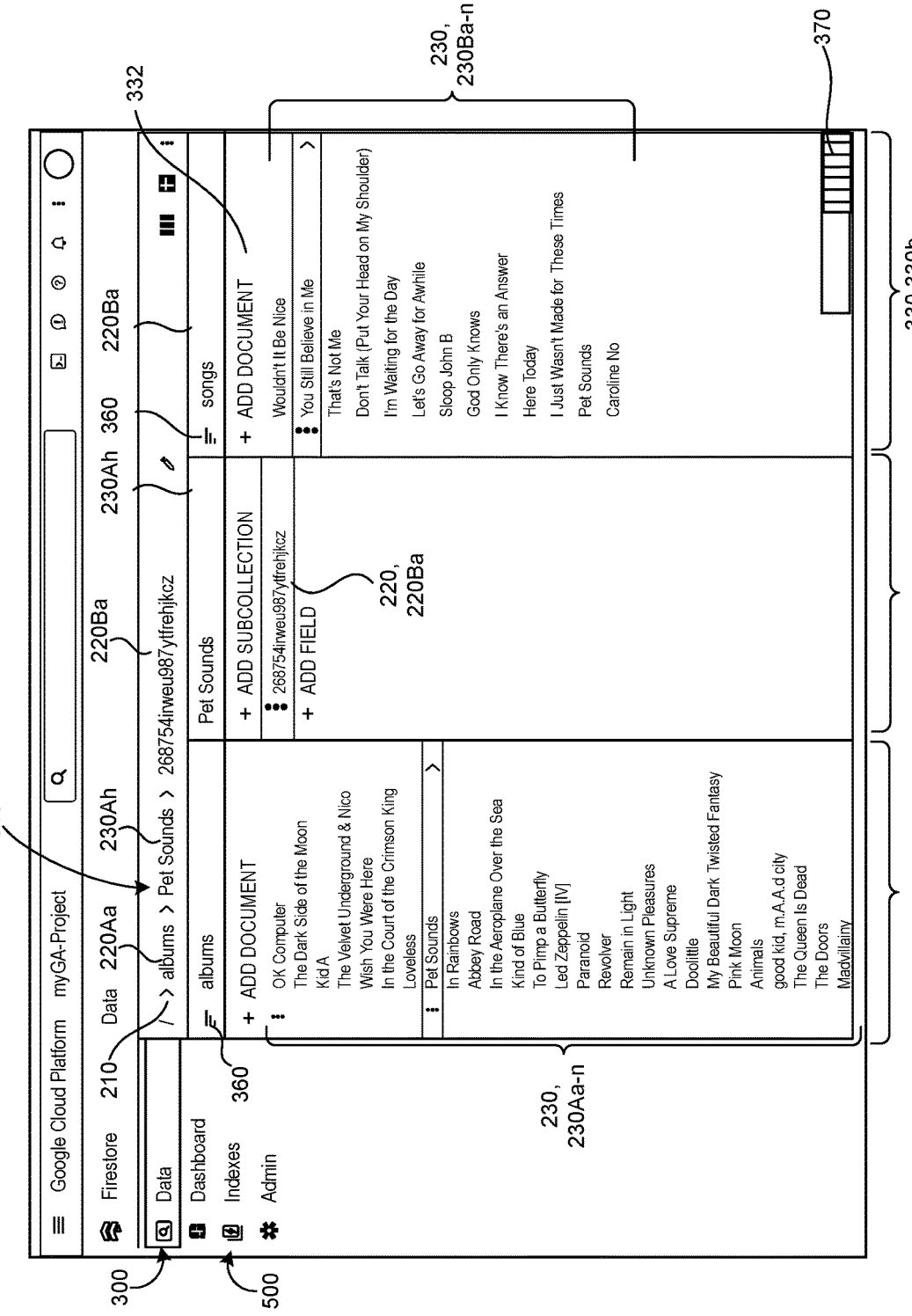
FIG. 4B is a schematic view of the hierarchical user interface of FIG. 4A, displaying the first data collection, the first data object, and a second data collection.
Figure 4C:
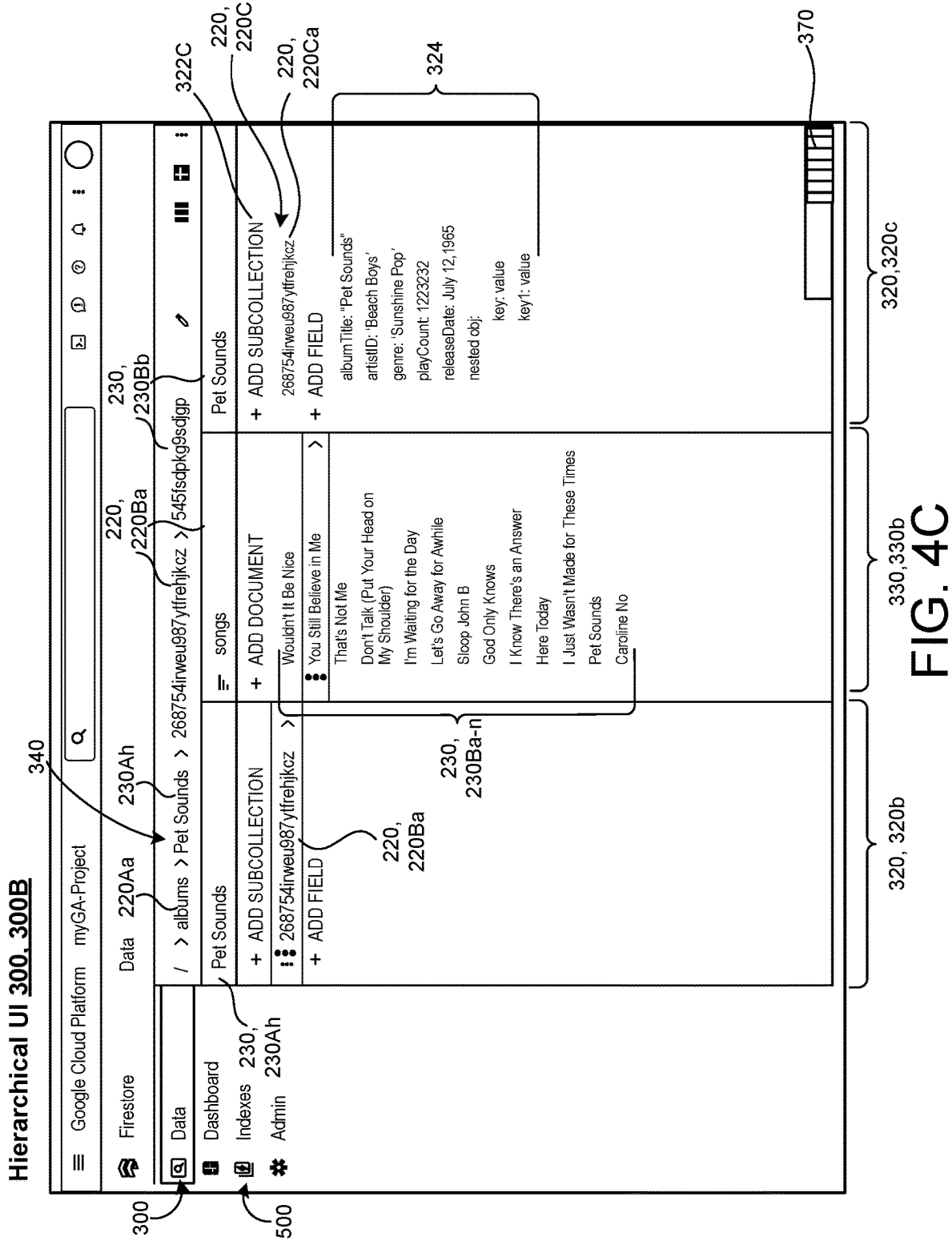
FIG. 4C is a schematic view of the hierarchical user interface of FIG. 4A, displaying the first data object, the second data collection, and a second data object.

Referring to FIGS. 4A-4C another example hierarchical UI 300, 300B includes data-collection columns 320 and data-object columns 330 laterally adjacent to the data-collection columns 320. As with the hierarchical UI 300, 300A of FIGS. 3A and 3B, the hierarchical UI 300, 300B of FIGS. 4A-4C includes the columns alternating between data-object columns 330 and data-collection columns 320. The data-collection columns 320 include a root-data-collection column 320a displaying a list of the one or more data collections 220, 220A, 220Aa-n associated with the root data object 210. Here, the list of data collections 220Aa-n displayed in the root-data-collection column 320a include data collections 220 for "albums", "vehicles", "games", "utopias", "plants", and "apps". The root-data-object collection column 320a further includes an add-collection form 322 (e.g., ADD COLLECTION") to enable the hierarchical UI 300B to receive data collection parameters for a new data collection, as discussed above with reference to FIGS. 3A and 3B.

Referring to FIG. 4A, in response to the root-data-object collection column 320a receiving a user-selection indicating a selected data collection 220Aa corresponding to "albums", the data processing hardware 112, 142 identifies the respective root-data-collection column 320a associated with the selected data collection 220A and displays in the adjacent first data-object column 330a one or more data objects 230, 230A, 230Aa-n associated with the selected data collection 220Aa. Here, the one or more data objects 230Aa-n displayed in the first data-object column 330a include respective music albums the user 102 owns or has access to. The first data-object column 330a further includes an add-object form 332 (e.g., ADD DOCUMENT") to enable the hierarchical UI 300B to receive data object parameters for one or more new data objects (e.g., music albums) associated with the selected data collection 220Aa, as discussed above with reference to FIGS. 3A and 3B.

With continued reference to FIG. 4A, in response to the data processing hardware 112, 142 receiving a user-selection indicating selection of a selected data object 230Ah within the first data-object column 330a, the data processing hardware 112, 142 identifies the respective data-object column 330a of the selected data object 230Ah and displays in the adjacent data-collection column 320b one or more other data collections 220, 220B, 220Ba-n associated with the selected data object 230Ah. Here, the one or more data collections 220B displayed in the data-collection column 320b includes a single data collection 220Ba representative of respective songs associated with the music album "Pet Sounds" representing the selected data object 230Ah. Specifically, FIG. 4A shows the data-collection column 330a including a file path (e.g., "268754irweu987ytfrehjkcz") associated with data-collection 220Ba ("songs"). The data-collection column 320b further includes an add-object form 322 (e.g., ADD SUBCOLLECTION") to enable the hierarchical UI 300B to receive data collection parameters for one or more new data collections (e.g., songs) associated with the selected data collection 220Ba, as discussed above with reference to FIGS. 3A and 3B.

In response to the data processing hardware 112, 142 receiving a user-selection of the data-collection 220B in the data-collection column 320b in FIG. 4A, FIG. 4B shows the data processing hardware 112, 142 identifying the respective data-collection column 320b associated with the selected data collection 220Ba and displaying in an adjacent new data-object column 330b one or more other data objects 230, 230Ba-n associated with the selected data collection 220Ba. In the example shown, the display of the new data-object column 330b to the far right of the screen 116 causes hierarchical UI 300 to shift the existing first data-object column 330b and the data-collection column 320b to the left, while transitioning the root-data-collection column 320a out of view. That is, when the second data-object column 330b is opened on the far right of the screen 116, the root-data-collection column 320 shifts to the left and is hidden from view, while the first data-object column 330a is now displayed to the far left of the screen 116 and the data-collection column 320b is now displayed in the middle of the screen 116.

However, the user 102 may laterally scroll along the UI 300 to bring the root-data-collection column 320a back into view by manipulating the lateral scroll bar 370 and/or providing a user-selection indicating selection anywhere within either one of the first data-object column 330b or the data-collection column 320b. Any columns out of view in the hierarchy could also be brought back into view by selecting an identifier of the previously selected collection 220 or object 230 in the file path 340 that associated with the column 320, 330 the user wants to bring back into view. The list of the one or more other data objects 230, 230Ba-n displayed in the second data-object column 330b and associated with the selected data collection 220Ba from the adjacent data-collection column 320b include a list of songs associated with the music album (e.g., data object 230Ah)

entitled "Pet Sounds". Thus, upon the user-selection indicating selection of one of the data objects 230A, i.e., the eighth data object 230Ah ("Pet Sounds"), the second data-collection column 320, 320B opens laterally adjacent to the first data-object column 330A, and displays the plurality of data collections 220, 220Ba-n nested under the selected data object 230 (e.g., the eighth data object 230Ah ("Pet Sounds")).

In response to the data processing hardware 112, 142 receiving a user-selection of the data-object 230Bb in the second data-object column 330b in FIG. 4B, FIG. 4C shows the data processing hardware 112, 142 identifying the respective data-object column 330b associated with the selected data object 230Bb and displaying in an adjacent new data-collection column 320c one or more other data collections 220, 220Ca associated with the selected data object 230Bb. In the example shown, the display of the new data-collection column 320c to the far right of the screen 116 causes the hierarchical UI 300 to shift the existing data-collection column 320b and the data-object column 330b to the left, while transitioning the first data-object column 330a out of view. The user may bring the first data-object column 330a (and also the root-data-collection column 320a) back into view using the techniques described above with reference to FIG. 4B. Specifically, FIG. 4C shows the data-collection column 320c including the same file path (e.g., "268754irweu987ytfrehjkcz) associated with data-collection 220Ca ("songs") that is associated with the data-collection 220Ba in the data-collection column 320a to the far right of the screen 116. The data-collection column 320c also includes one or more attributes 324 nested under the selected data object 230Bb that represents the song "You Still Believe in Me" nested under the selected data collection 220Ah that represents the music album "Pet Songs".

Referring to FIG. 4C, upon a selection indication indicating selection of one of the data objects 230B, i.e., the second data object 230Bb ("You Still Believe in Me"), the third data-collection column 320, 320C opens laterally adjacent to the second data-object column 330B, and displays the plurality of data collections 220, 220Ca-n nested under the selected data object 230 (e.g., the second data object 230Bb ("You Still Believe in Me")). As shown in FIG. 4C, the second data object 230Bb may also be displayed as its document ID, i.e., "545fsdpkg9sdjgp." In some implementations, when the third data-collection column 320C is opened on the far right of the screen 116, the first data-object column 320A shifts to the left and is hidden from view, the second data-collection column 320B is now on the far left of the screen 116, and the second data-object column 330B is now in the middle of the screen 116.

In one example, as shown in FIG. 4A, the data-collection column 320b includes the add-collection form 322, i.e., "+ADD SUBCOLLECTION." A new data collection 220 added to the data-collection column 320b would be linked to (i.e., associated with) the respective parent data object 230, i.e., the eighth data object 230Ah ("Pet Sounds"). For instance, a second data collection 220Bb corresponding to "artist" may be added in the data-collection column 320b. Here, the artist of the album "Pet Sounds" is associated to the respective parent data object 230, i.e., the eighth data object 230Ah ("Pet Sounds").

In another example, as shown in FIG. 4B, the data-object column 330b includes the add-object form or UI element 332, i.e., "+ADD DOCUMENT." A new data object 230 added to the data-object column 330b would be linked to the respective parent data collection 220, i.e., the first data collection 220Ba ("268754irweu987ytfrehjkcz"). For instance, the fourteenth data object 230Bn corresponding to "Hidden Track" may be added in the second data-object column 330b. In this example, the song "Hidden Track" of the album "Pet Sounds" is associated to the respective parent data collection 220, i.e., first data collection 220Ba ("268754irweu987ytfrehjkcz," corresponding to "songs").

While presenting the example hierarchical UIs 300 of FIGS. 3A-4C, the data processing hardware 112, 142 may receive a user-selection indicating selection of a tabular view 500 (e.g., "Index" within UI 300) and transition from displaying the hierarchical UI on the screen 116 to displaying a tabular UI 500 on the screen 116 as shown in FIG. 5. FIG. 5 shows the tabular UI including root-data-collection rows 520 each displaying a respective data collection 220 of the list of the one or more data collections 220 associated with the root-data object 210. The tabular view 500 may include multiple columns each designating a respective category 524 associated with the data collection 220 of the corresponding row 520. Specifically, each column may include a categorical column associated with a respective category 524 and each root-data-collection row 520 may include a respective value assigned to each categorical column. In some implementations, the tabular view 500 displays a filter form 560 configured to receive input of one or more filter conditions for filtering the display of the tabular UI 500 in accordance with the one or more filter conditions. The filter conditions input to the filter form 560 may be applied to a transition back to the hierarchical UI 300 of FIGS. 3A-4C. Likewise, filter condition 325 input via the filter form 362 of FIG. 3B may be applied during the transition to the tabular UI 500 of FIG. 5.

Figure 6:
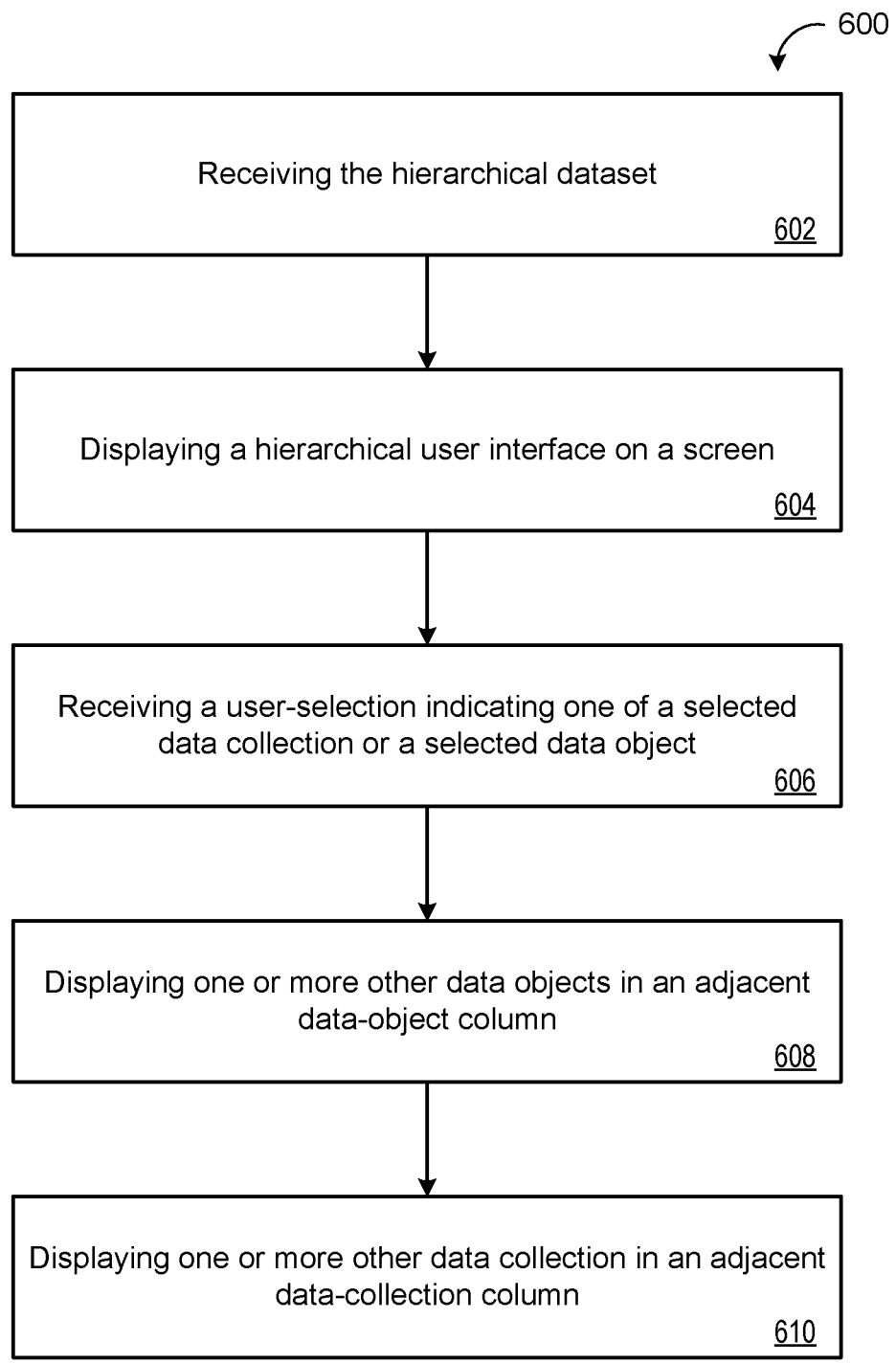
FIG. 6 is a flowchart of an example method for presenting a hierarchical dataset.

FIG. 6 is a flowchart of an example arrangement of operations of a method 600 for presenting a hierarchical dataset 200. At operation 602, the method 600 includes receiving, by data processing hardware 112, 142, the hierarchical dataset 200. The hierarchical dataset 200 includes at root-data object 210 and data collections 220 nested under the root-data object 210. Each data collection 220 includes one or more data objects 230 each associated with one or more other data collections 220.

At operation 604, the method 600 includes displaying, by the data processing hardware 112, 142, a hierarchical UI 300 on a screen 116. The hierarchical UI 300 has columns including data-object columns 330 and data-collection columns 320. The data-object columns 330 each display a list of the one or more data objects 230 of a respective data collection 220. Each data-collection column 320 displays a list of the one or more data collections 220 of a respective data object 230, wherein the data-collection columns 320 include a root-data-collection column 320a displaying a list of the one or more data collections 220 associated with the root-data object 210. The columns alternate between data-object columns 330 and data-collection columns.

At operation 606, the method 600 includes receiving, at the data processing hardware 112, 142, a user-selection indicating one of a selected data collection 220 or a selected data object 230. In response to receiving the user-selection indicating selection of the selected data collection 220, the method 600 includes, at operation 608, identifying, by the data processing hardware 112, 142, the respective data-collection column 320 of the selected data collection 220 and displaying, by the data processing hardware 112, 142, in the adjacent data-object column 330 the one or more other data objects 230 associated with the selected data collection 220. In response to receiving the user-selection indicating selection of the selected data object 230, the method 600 includes, at operation 610, identifying, by the data processing hardware 112, 142, the respective data-object column 330 of the selected data object 230 and displaying, by the data processing hardware 112, 142, in the adjacent data-collection column 320 the one or more other data collections 220 associated with the selected data object 230.

Figure 7:
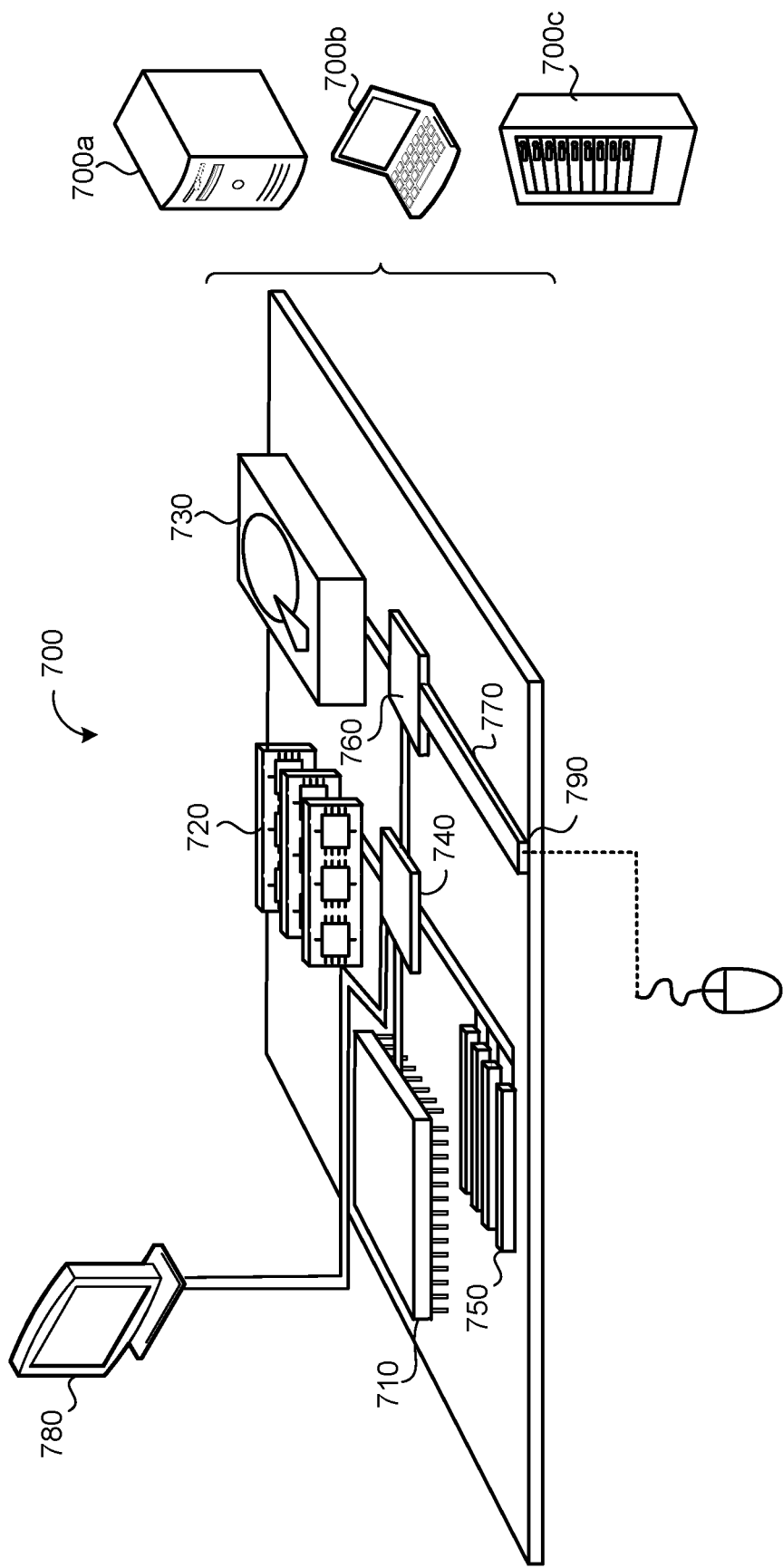
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs).

Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware, a hierarchical dataset, the hierarchical data set comprising a root-data object and data collections nested under the root-data object, each data collection comprising one or more data objects, each data object associated with one or more other data collections;
displaying, by the data processing hardware, a hierarchical user interface on a screen, the hierarchical user interface comprising columns, the columns comprising:
data-object columns, each data-object column displaying a list of the one or more data objects of a respective data collection; and
data-collection columns, each data-collection column displaying a list of the one or more data collections of a respective data object, the data-collection columns comprising a root-data-collection column displaying a list of the one or more data collections associated with the root-data object,
wherein the columns alternate between data-object columns and data-collection columns;
receiving, at the data processing hardware, a user-selection indicating a selected data collection;
in response to the user-selection indicating selection of the selected data collection, displaying, by the data processing hardware, in a subsequent laterally adjacent data-object column, the one or more other data objects associated with the selected data collection;
receiving, at the data processing hardware, a user-selection indicating a selected data object; and
in response to the user-selection indicating selection of the selected data object, displaying, by the data processing hardware, in a subsequent laterally adjacent data-collection column, the one or more other data collections associated with the selected data object.

2. The method of claim 1, wherein the user interface comprises a lateral scroll bar configured to scroll laterally among the columns.

3. The method of claim 1, wherein at least one data-collection column comprises an add-collection form, the add-collection form configured to:
receive data collection para meters for a new data collection comprising one or more of the data objects, the data collection parameters including a parent reference to a parent data object; and
associate the new data collection with the respective parent data object.

4. The method of claim 3, further comprising, after associating the new data collection with the respective parent data object:
receiving, at the data processing hardware, a user-selection indicating selection of the new data collection; and
in response to receiving the user-selection indicating selection of the new data collection, displaying, by the data processing hardware, in the subsequent laterally adjacent data-object column an add-object form, the add-object form configured to:
receive data object para meters for one or more new data objects, the data object parameters including a parent reference to the new data collection; and
associate the one or more new data objects with the respective new data collection.

5. The method of claim 1, further comprising:
displaying, by the data processing hardware, a filter form on the screen;
receiving, at the data processing hardware, a filter condition inputted into the filter form; and
filtering, by the data processing hardware, the display of the hierarchical user interface in accordance the filter condition.

6. The method of claim 5, further comprising, after filtering the display of the hierarchical user interface, displaying a visual indicator in the hierarchical user interface indicating the filter condition.

7. The method of claim 1, wherein at least one data-object column comprises a filter form, the filter form configured to:
receive one or more filter conditions for the list of the one or more data objects displayed by the respective data-object column; and
filter the display of the list of the one or more data objects in accordance with the one or more filter conditions.

8. The method of claim 1, further comprising:
receiving, at the data processing hardware, a user-selection indicating selection of a tabular view; and
in response to receiving the user-selection indicating selection of the tabular view, transitioning, by the data processing hardware, from displaying the hierarchical user interface on the screen to display of a tabular user interface on the screen, the tabular user interface comprising root-data-collection rows, each root-data-collection row displaying a respective data collection of the list of the one or more data collections associated with the root-data object.

9. The method of claim 8, wherein each root-data-collection row comprises one or more categorical columns, each categorical column associated with a respective category and each root-data-collection row comprising a respective value assigned to each categorical column.

10. The method of claim 8, further comprising, while displaying the tabular user interface:
displaying, by the data processing hardware, a filter form on the screen;
receiving, at the data processing hardware, one or more filter conditions inputted into the filter form; and
filtering, by the data processing hardware, the display of the tabular user interface in accordance the one or more filter conditions.

11. The method of claim 10, further comprising, after filtering the display of the tabular user interface in accordance with the one or more filter conditions:
receiving, at the data processing hardware, a user-selection indicating selection of a hierarchical view; and
in response to receiving the user-selection indicating selection of the hierarchical view, transitioning, by the data processing hardware, back to displaying the hierarchical user interface on the screen, the display of the hierarchical user interface filtered in accordance with the one or more filter conditions that were inputted into the filter form while displaying the tabular user interface.

12. A system comprising:
data processing hardware; and
memory hardware in communication with the data processing hardware and storing instructions that when executed by the data processing hardware cause the data processing hardware to perform operations comprising:
receiving a hierarchical dataset, the hierarchical dataset comprising a root-data object and data collections nested under the root-data object, each data collection comprising one or more data objects, each data object associated with one or more other data collections;
displaying a hierarchical user interface on a screen, the hierarchical user interface comprising columns, the columns comprising:
data-object columns, each data-object column displaying a list of the one or more data objects of a respective data collection; and
data-collection columns, each data-collection column displaying a list of the one or more data collections of a respective data object, the data-collection columns comprising a root-data-collection column displaying a list of the one or more data collections associated with the root-data object,
wherein the columns alternate between data-object columns and data-collection columns;
receiving a user-selection indicating a selected data collection;
in response to the user-selection indicating selection of the selected data collection, displaying in a subsequent laterally adjacent data-object column, the one or more other data objects associated with the selected data collection;
receiving a user-selection indicating a selected data object; and
in response to the user-selection indicating selection of the selected data object, displaying in a subsequent laterally adjacent data-collection column, the one or more other data collections associated with the selected data object.

13. The system of claim 12, wherein the user interface comprises a lateral scroll bar configured to scroll laterally among the columns.

14. The system of claim 12, wherein at least one data-collection column comprises an add-collection form, the add-collection form configured to:
receive data collection parameters for a new data collection comprising one or more of the data objects, the data collection parameters including a parent reference to a parent data object; and
associate the new data collection with the respective parent data object.

15. The system of claim 14, wherein the operations further comprise, after associating the new data collection with the respective parent data object:
receiving a user-selection indicating selection of the new data collection; and
in response to receiving the user-selection indicating selection of the new data collection, displaying in the subsequent laterally adjacent data-object column an add-object form, the add-object form configured to:
receive data object parameters for one or more new data objects, the data object parameters including a parent reference to the new data collection; and
associate the one or more new data objects with the respective new data collection.

16. The system of claim 12, wherein the operations further comprise:
displaying a filter form on the screen;
receiving a filter condition inputted into the filter form; and
filtering the display of the hierarchical user interface in accordance the filter condition.

17. The system of claim 16, wherein the operations further comprise, after filtering the display of the hierarchical user interface, displaying a visual indicator in the hierarchical user interface indicating the filter condition.

18. The system of claim 12, wherein at least one data-object column comprises a filter form, the filter form configured to:
receive one or more filter conditions for the list of the one or more data objects displayed by the respective data-object column; and
filter the display of the list of the one or more data objects in accordance with the one or more filter conditions.

19. The system of claim 12, wherein the operations further comprise:
receiving a user-selection indicating selection of a tabular view; and
in response to receiving the user-selection indicating selection of the tabular view, transitioning from displaying the hierarchical user interface on the screen to display of a tabular user interface on the screen, the tabular user interface comprising root-data-collection rows, each root-data-collection row displaying a respective data collection of the list of the one or more data collections associated with the root-data object.

20. The system of claim 19, wherein each root-data-collection row comprises one or more categorical columns, each categorical column associated with a respective category and each root-data-collection row comprising a respective value assigned to each categorical column.

21. The system of claim 19, wherein the operations further comprise, while displaying the tabular user interface:
    displaying a filter form on the screen;
    receiving one or more filter conditions inputted into the filter form; and
    filtering the display of the tabular user interface in accordance the one or more filter conditions.

22. The system of claim 21, wherein the operations further comprise, after filtering the display of the tabular user interface in accordance with the one or more filter conditions:
    receiving a user-selection indicating selection of a hierarchical view; and
    in response to receiving the user-selection indicating selection of the hierarchical view, transitioning back to displaying the hierarchical user interface on the screen, the display of the hierarchical user interface filtered in accordance with the one or more filter conditions that were inputted into the filter form while displaying the tabular user interface.

* * * * *